United States Patent [19]

Graves

[11] 4,378,927

[45] Apr. 5, 1983

[54] VEHICLE SEAT MOUNTING DEVICES

[75] Inventor: Kevin J. Graves, Cogenhoe, England

[73] Assignee: UOP Inc., Des Plaines, Ill.

[21] Appl. No.: 149,206

[22] Filed: May 12, 1980

[30] Foreign Application Priority Data

May 16, 1979 [GB] United Kingdom ............... 7916983

[51] Int. Cl.³ .......................................... F16M 13/00
[52] U.S. Cl. .................................... 248/561; 248/430
[58] Field of Search ............... 248/561, 565, 570, 574, 248/430

[56] References Cited

U.S. PATENT DOCUMENTS 3,258,241  6/1966  Oswald ............................... 248/430
3,702,179 11/1972  Radke et al. ......................... 248/430
3,843,087 10/1974  Adams ................................ 248/430

FOREIGN PATENT DOCUMENTS 637219  5/1950  United Kingdom ................ 248/430

Primary Examiner—Dave W. Arola
Attorney, Agent, or Firm—James R. Hoatson, Jr.; Barry L. Clark; William H. Page, II

[57] ABSTRACT

A vehicle seat mounting device comprises a first frame and a second frame mounted for relative sliding movement by guide rails attached to one of the frames which are engaged by rollers on the other of the frames. An intermediate frame within the device is connected to the first frame by a position adjusting device operable by a first actuator whereby the first frame can be locked to the intermediate frame in any one of a plurality of different selected positions. The intermediate frame is connected to the second frame by springs to allow resilient relative movement therebetween. A lock-out device is operable by a second actuator to lock the intermediate frame to the second frame. A common operating member coupled to the first and second actuator is movable between a first position in which the first and second frames are movable under the constraint of the springs, a second position in which the first and second frames are locked together and a third position in which the springs are locked out and the first frame is adjustable relative to the intermediate frame.

8 Claims, 13 Drawing Figures

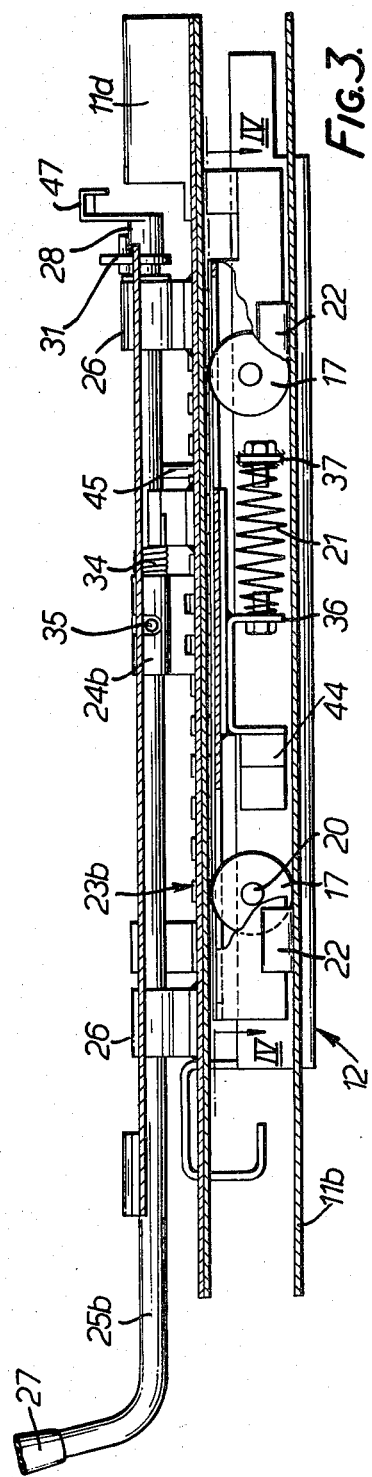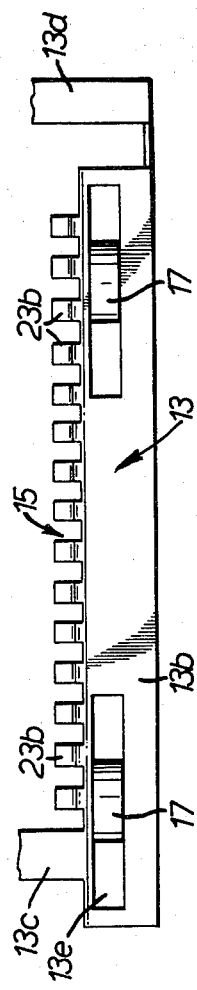

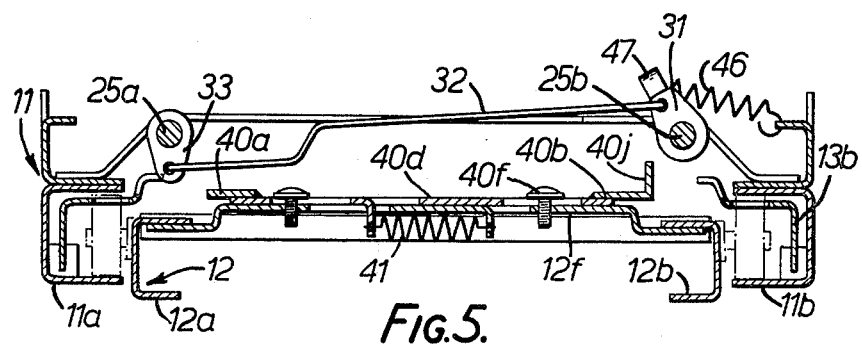
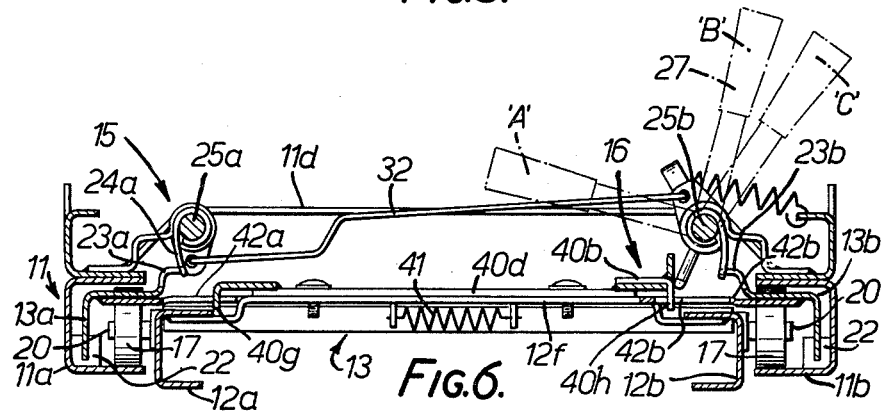
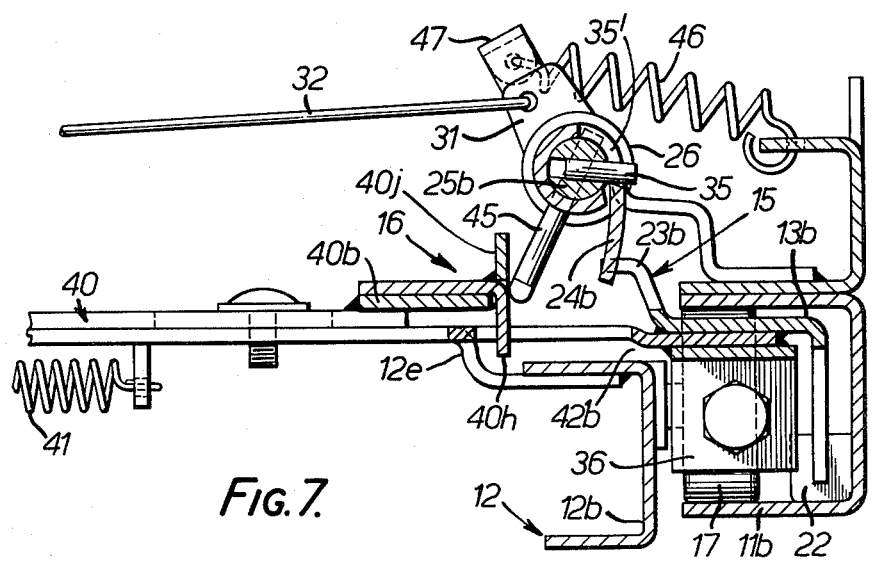

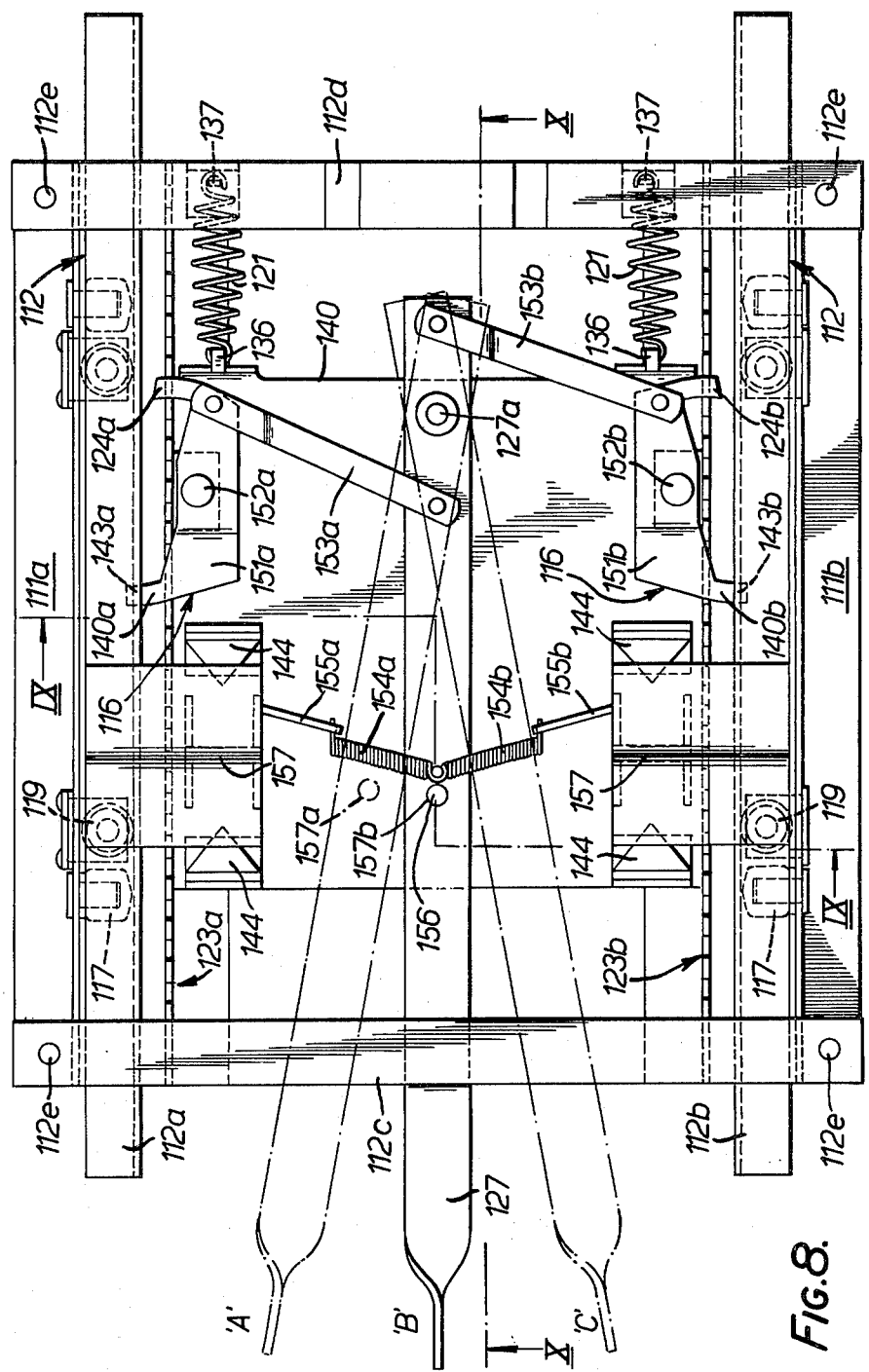

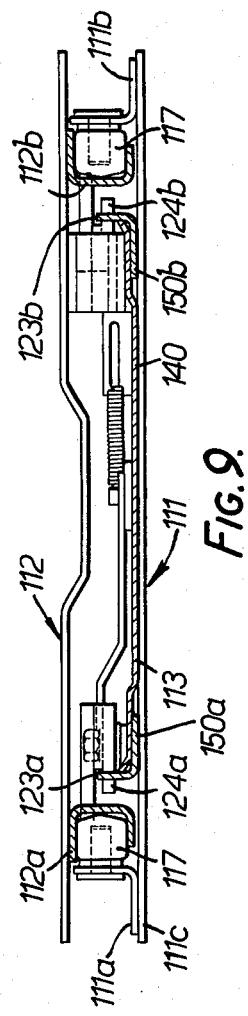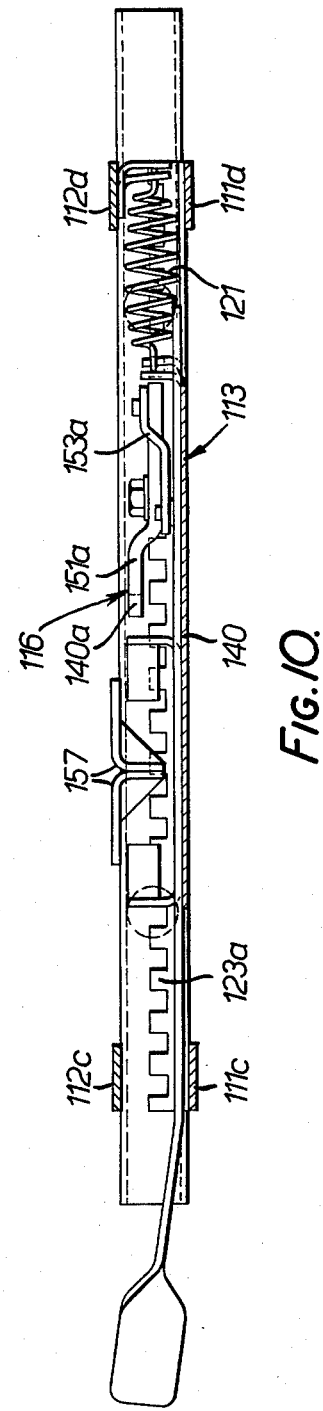

VEHICLE SEAT MOUNTING DEVICES

BACKGROUND OF THE INVENTION

This invention relates to vehicle seat mounting devices for mounting a vehicle seat on the floor of the vehicle yet permitting relative movement therebetween.

Seat mounting devices are known which comprise slide rails to permit the seat to be moved forwards or backwards and secured in a desired position relative to the floor of the vehicle.

Again, seat mounting devices are known of the so-called Fore and Aft Isolator type, in which the device permits limited forward and rearward sliding movement of the seat relative to the vehicle floor under the control of springs which isolate the seat occupant at least partially from vehicle vibration in the fore and aft direction.

In particular it is known from U.S. Pat. No. 3,258,241 to provide a vehicle seat mounting device comprising two frames mounted one above the other for connection respectively to the floor of a vehicle and to the underside of a vehicle seat, one frame having spaced-apart guide rails thereon and the other frame having rollers thereon which engage in the guide rails and permit relative sliding movement between the two frames, a third or intermediate frame connected to a first one of the frames through a position-adjusting device and connected to the second frame through a spring device, the position-adjusting device including a first actuator movable into and out of an engaged state in which it locks the position-adjusting device in any one of a plurality of selected static positions of the first frame relative to the second frame, a lock-out device and a second actuator movable into and out of an engaged state in which it causes the lock-out device to lock the intermediate frame to the second frame thereby rendering the spring means inoperative.

An object of the invention is to provide a seat mounting device which not only combines the functions of the two known types of mounting devices referred to above in a simple and convenient manner without substantially increasing the space occupied by the device between the vehicle seat and vehicle floor, but also provides combined operating means for the two functions.

BRIEF SUMMARY OF THE INVENTION

This is achieved in accordance with the invention by the provision of a common operating member connected to said first actuator and second actuator and movable between a first mode 'A' in which the first actuator is in its engaged state and the second actuator is in its disengaged state so that the first and third frames are secured together but movable relative to the second frame under the restraint of the spring means, a second mode 'B' in which both first and second actuators are in their engaged state so that relative movement between the first, second and third frames is prevented, and a third mode 'C' in which the first actuator is in its disengaged state and the second actuator is in its engaged state so that the first frame is movable relative to the second and third frames to change their selected relative positions.

The vehicle seat mounting device of the present invention is particularly designed for use with a suspension seat, of the type in which a seat part is mounted on a spring suspension, which comprises two pairs of spaced-apart crossed-arm linkages biassed in an upward direction by a spring. The mounting device can be fitted either directly between the vehicle floor and the lowermost part of the suspension or between the seat part and the uppermost part of the suspension.

BRIEF DESCRIPTION OF THE DRAWINGS

The invention will now be particularly described with reference to the two embodiments of the invention illustrated in the accompanying drawing in which:

FIG. 3 is a side elevation of the device of FIG. 1 part sectioned on the line III—III of FIG. 1;

FIG. 4 is a section through part of the device of FIG. 1 taken on line IV—IV of FIG. 3;

FIGS. 5 and 6 are sections on the lines V—V and VI—VI of FIG. 1;

FIG. 7 is a section on the line VII—VII of FIG. 1 but on a larger scale than that of FIGS. 5 and 6 to show greater detail;

FIG. 8 is a plan view of a second embodiment of a vehicle seat mounting device according to the invention;

FIG. 9 is a section on the line IX—IX of FIG. 8; and

FIG. 10 is a section on the line X—X of FIG. 8.

DETAILED DESCRIPTION

Figure 1:
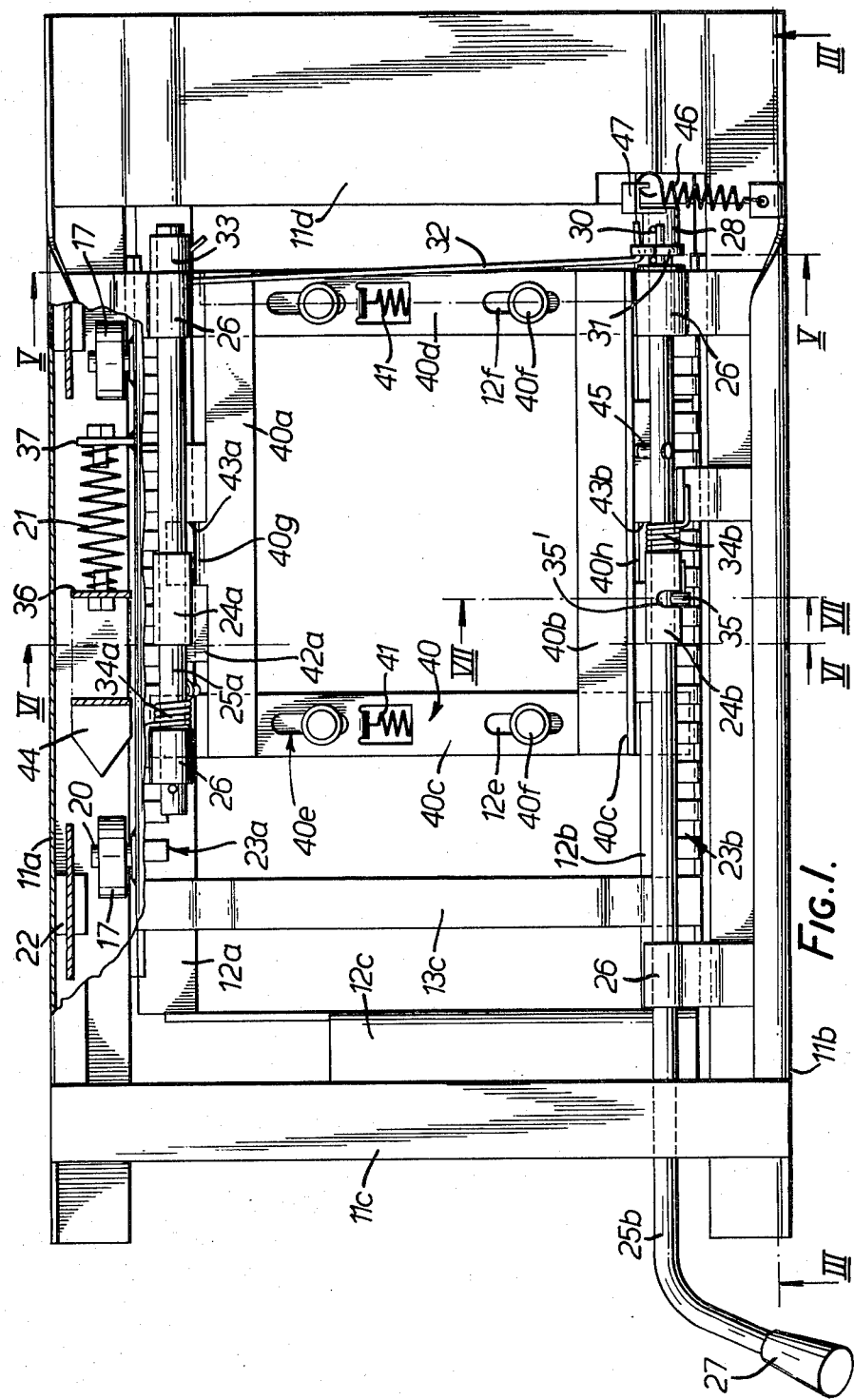
FIG. 1 is a plan view of a first embodiment of a vehicle seat amounting device according to the invention.
Figure 2:
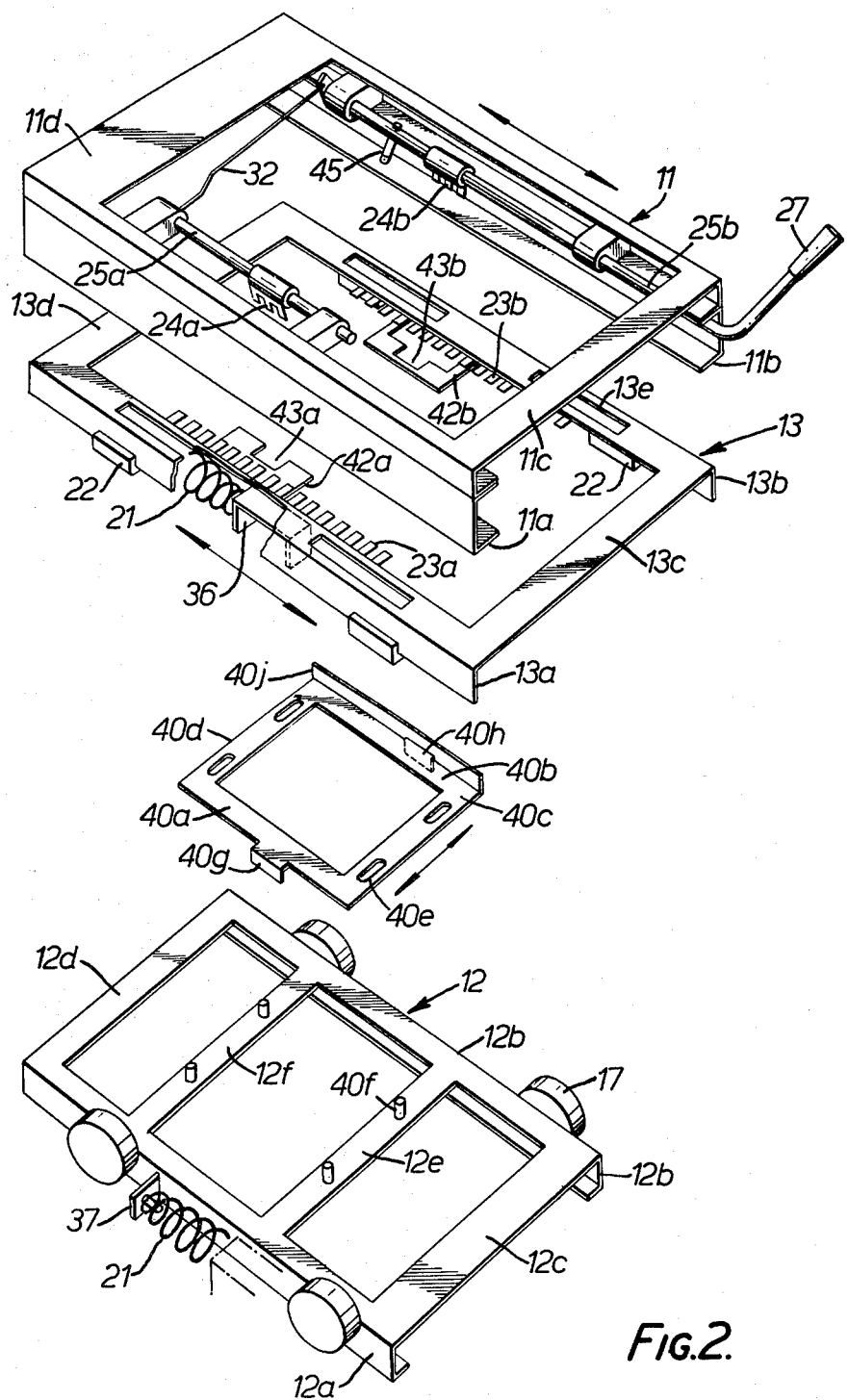
FIG. 2 is an exploded perspective view of the mounting device of FIG. 1, shown diagrammatically.

As shown in FIGS. 1 to 7, the vehicle seat mounting device comprises a first frame 11 for attachment to the underside of the seat part (either directly or via a spring suspension), a second frame 12 for attachment to the floor of the vehicle (either via a spring suspension or directly) and a third or intermediate frame 13.

Briefly the lower frame 12 carries rollers 17 which engage in longitudinally (i.e. fore-and-aft) extending parallel-spaced guide rails 11a,11b of the upper frame 11. Thus the upper frame is supported by the rollers for movement in a longitudinal direction to locate the seat at a selected longitudinal position. The intermediate frame 13 is connected to the lower frame 12 by fore-and-aft extending springs 21 (FIG. 3) which assist in isolating the seat part from longitudinal vibrations transmitted to the lower frame from the vehicle. The intermediate frame 13, on the other hand, is connected to the upper frame 11 by a position-adjusting device 15 (FIGS. 4 and 7) which, when released, enables the longitudinal position of the upper frame to be adjusted relative to the intermediate frame. When the position-adjusting device is locked to secure the upper frame 11 to the intermediate frame 13, the upper frame can move longitudinally relative to the lower frame only resiliently, i.e. under the restraint of the springs 21. A lock-out device 16 is provided which, when operative, locks the intermediate frame 13 directly to the lower frame 12 to eliminate the action of the springs, and a common operating handle 27 is provided to operate the lock-out device and the position adjusting device sequentially.

Following this brief outline of the main parts of the mounting device, we will consider its construction in detail.

The lower frame 12 comprises two parallel spaced side members 12a, 12b interconnected by cross members 12c 12d, 12e and 12f. Four rollers 17 are provided, each mounted on horizontal support shafts 20 extending outwardly from the side members 12a, 12b.

The upper frame 11 comprises two parallel spaced inwardly-opening channel section guide members 11a, 11b within which the rollers 17 engage, the rollers contacting the underside of the upper flange of each guide member. The guide members are interconnected by cross members 11c, 11d.

The intermediate frame 13 comprises an opposed pair of parallel-spaced inverted L section members 13a, 13b which fit within the guide members 11a, 11b and are interconnected by cross-members 13c, 13d. The upper flange of each member 13a, 13b contains elongate slots 13e through which the rollers 17 project to contact the guide members 11a, 11b. The length of the slots 13e is sufficient to allow the necessary relative movement between the intermediate frame 13 and lower frame 12 when these frames are permitted to move longitudinally with respect to each other under the restraint of the springs 21.

The lower edges of the L section members 13a, 13b are covered by low-friction U section plastics strips 22 which engage in the lower corner of the C section guide members 11a, 11b to locate the intermediate frame 13 laterally with respect to the upper frame 11.

The positioning device 15, for positioning the upper frame 11 longitudinally with respect to the intermediate frame 13, comprises two toothed racks 23a, 23b which are formed along the inner edges of the L section members 13a, 13b with their teeth directed inwardly, and two rotatable pawls 24a, 24b supported on the upper frame for engagement with the racks. The pawls are carried by two actuating shafts 25a, 25b extending parallel to the racks and journalled in posts 26 upstanding from the upper frame 11.

The shaft 25b is a master shaft, rotatable by a handle 27 extending radially from one end thereof, and the other shaft is a slave shaft 25a connected to the master shaft by a lost motion connection. The lost motion connection consists of a sleeve 28 secured on the end of master shaft 25b and having a pin 30 extending radially therefrom. A radial arm 31 fitted rotatably on and upstanding from the master shaft 25b is engageable with the pin 30. The radial arm 31 is connected at its outer end by a connecting rod 32 to the outer end of a radial arm 33 fixed to and depending from the slave shaft 25a. Thus when rotation of shaft 25b causes the pin 30 on the sleeve 28 to engage the radial arm 31, the rotary movement of the radial arm 31 is transmitted through the connecting rod 32 to the radial arm 33, thereby causing slave shaft 25a to rotate the pawl 24a oppositely to pawl 24b.

The pawl 24a is rigidly mounted on the slave shaft, and biassed towards engagement with rack 23a by a coil spring 34a surrounding shaft 25a and anchored on upper frame 11. The pawl 24b is rotatably mounted on the master shaft 25b and biassed towards engagement with the rack 23b by a coil spring 34b surrounding the shaft 25b and anchored on the upper frame 11. A pin 35 projecting from the master shaft 25b is arranged to engage in a slot 35' in the pawl 24b and to pick up the pawl 24b and move the pawl out of engagement with the rack 23b as the handle 27 is moved clockwise into its 'Fore and Aft Adjustment' position 'C'.

Returning now to a consideration of the intermediate frame 13 itself, this is connected to the lower frame 12 by the coil springs 21 each of which is located within one of the L section members 13a, 13b, the opposite ends of each spring 21 being secured respectively to a lug 36 on the adjacent L section member 13a or 13b, and a lug 37 on the adjacent side member 12a or 12b of the lower frame 12.

The lock-out device 16 which is operative to lock the third frame 13 to the lower frame 12 to render the springs 21 inoperative, comprises a frame-shaped spring plate 40 which is mounted on the lower frame 12 between the two racks 23a, 23b and is slidably movable laterally of the L section members 13a, 13b on the cross members 12e, 12f, to engage pawls in the plate with recesses on the lower frame 12 as described below. In order to guide the movement of the spring plate 40, the front and rear sides 40c, 40d of the spring plate are formed with slots 40e which extend laterally and are engaged by bolts 40f upstanding from the cross-members 12e and 12f. Opposite side members 40a, 40b of the spring plate 40 carry fixed pawls 40g, 40h (FIG. 2) respectively. When the spring plate 40 is moved laterally against the force of return springs 41, connected between cross-members 40c, 12e and 40d, 12f, these pawls engage in corresponding elongate recesses 43a, 43b provided in a pair of anchor plates 42a, 42b secured to L section members 13a, 13b respectively and forming part of the intermediate frame 13. When such engagement occurs, the spring plate 40 locks the intermediate frame 13 to the lower frame 12.

Thus when the fixed pawls 40g, 40h of the spring plate 40 are disengaged from the recesses 43a, 43b of the anchor plates 42a, 42b, the intermediate frame 13 is free to move longitudinally relative to the lower frame 12 under the restraint of the coil springs 21. This movement is limited in the direction of expansion of the coil springs 21 by a rubber buffer 44 mounted on L section member 13a, 13b. The rubber buffer 44 is engaged by an abutment, such as roller 17, on the lower frame 12 in the limiting position.

The lateral movement of the spring plate 40 is effected by a radially-extending peg 45 on the master shaft 25b which engages an upwardly directed flange 40j on the spring plate in a 'Lock-out' position 'B' of the handle 27.

In operation of this embodiment, the common operating handle 27 is movable clockwise over an arc of about 120° from an extreme "Fore/Aft Isolation" position 'A' via the "lock-out" position 'B' to the "Fore/Aft Adjustment" position 'C'. In the "Fore/Aft Isolation" position 'A' the position adjusting device 15 is locked by engagement of the rotatable pawls 24a, 24b with the toothed racks 23a, 23b so that the upper frame 11 which carries the pawls is locked to the intermediate frame 13. However, the spring plate 40 is free from engagement with the anchor plates 42a, 42b of the intermediate frame 13 so that the intermediate and upper frames are movable, under the restraint of the coil springs 21, relative to the lower frame 12.

Figure 6A:
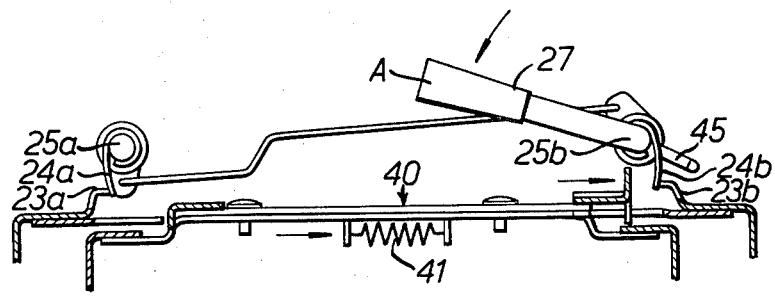
FIGS. 6a, 6b and 6c are diagrammatic simplified representations of FIG. 6 to illustrate the relative positions of the parts when the common operating member is located respectively in positions 'A', 'B' and 'C'.
Figure 6B:
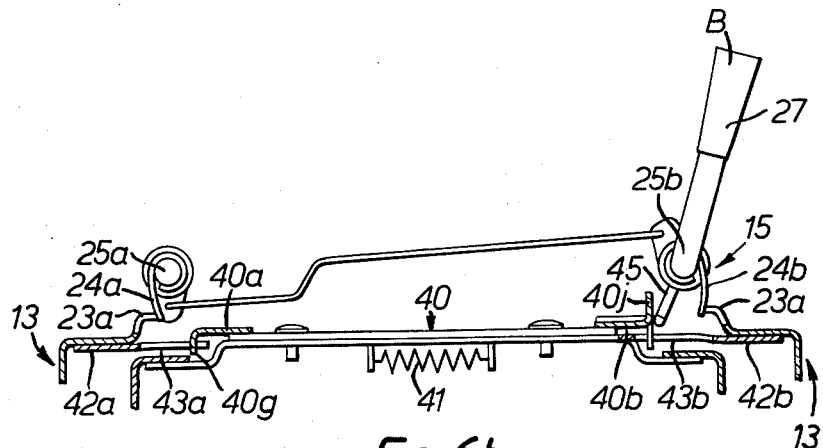

As the handle 27 is rotated clockwise from the position A of FIG. 6a to the position B of FIG. 6b, the pawls 24a, 24b remain in their engaged positions and handle 27 with shaft 25b is able to move relatively to the radial arm 31 by reason of the lost motion connection. A spring 46, connected between a lug 47 on sleeve 28 and an anchor point on frame 11, biasses handle 25b in the clockwise direction.

In the 'Lock-out' position 'B' the spring plate 40 is brought into locking engagement with the anchor plates 42a,42b so that the upper frame 11, intermediate frame 13 and lower frame 12 are rigidly interconnected.

Figure 6C:
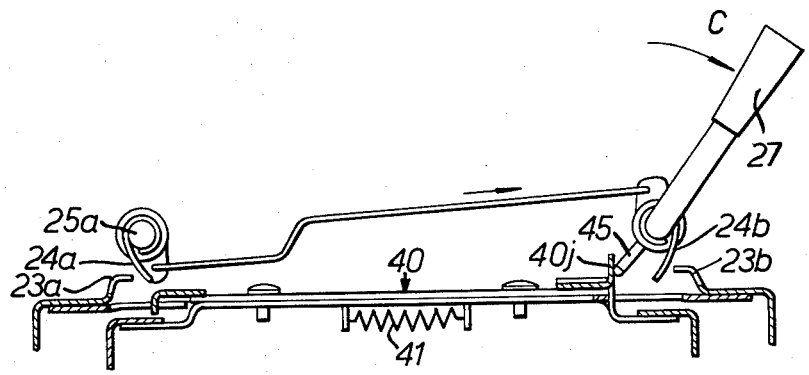

As the handle 27 is rotated clockwise from the position B of FIG. 6b to the position C of FIG. 6c, the pin 3 on sleeve 28 comes into engagement with a projection on radial arm 13 and drives arm 13 clockwise to move rod 32 and hence rotate slave shaft 25a in an anti-clockwise direction to urge pawl 24a against the force of spring 34a away from rack 23a. At the same time pin 35 on master shaft 25b reaches the end of slot 35' and urges pawl 24b away from rack 23b.

Thus in the "Fore/Aft Adjustment" position 'C', with the spring plate 40 moved still further to the left in FIG. 6c but remaining in locking engagement with the anchor plates 42a,42b, the pawls 24a,24b are disengaged from the toothed racks 23a,23b. This allows fore-and-aft movement of the upper frame 11 relative to the intermediate frame 13 while the intermediate frame 13 remains locked to the lower frame 12.

As the handle 27 is returned from position 'C' to position 'B' the springs 34a,34b act to bring pawls 24a,24b back into engagement with the racks 23a,23b.

In the second embodiment of the vehicle seat mounting device shown in FIGS. 8, 9 and 10, the upper or second frame 112 comprises, as shown, four frame members secured together in a rectangle, consisting of cross members 112c,112d which interconnect a parallel spaced pair of outwardly opening channel-section guide rails 112a,112b. Apertures 112e are formed at the corners of the rectangle by which the frame 112 can be bolted to the vehicle seat part.

The lower or first frame 111 comprises cross straps 111c,111d which interconnect a first parallel-spaced pair of L section members 111a,111b. The L section members 111a,111b are secured parallel to and alongside the guide rails 112a,112b each said L section member supporting at least two rollers 117, mounted on axes extending through both guide rails perpendicularly thereto, on which the guide rails are supported for longitudinal movement.

Each L section member also supports at least two further rollers 119 on vertical axes, the rollers 119 engaging in the guide rails to minimise lateral movement of the guide rails and hence yawing movement of the vehicle seat.

The third or intermediate frame 113 comprises a plate 140 which is slidably supported on the lower frame 111 between a pair of L section rails 150a,150b which are secured to the cross straps 111c,111d parallel to the guide rails 112a,112b. The plate 140 has upwardly turned lugs 136 at its rearward end, and tension/compression springs 121 are connected between the lugs 136 and corresponding lugs 137 on frame side 112d to connect the intermediate frame 113 resiliently to the upper frame 112.

To prevent excessive displacement of the intermediate frame 113 relative to the upper frame 112, longitudinally spaced apart rubber buffers 144 are provided on plate 140 for engagement with a lug 157 located between the buffers and mounted on the upper frame 112.

In order to connect the intermediate frame 113 positively to the upper frame 112, a lock-out device 116 is provided. The lock-out device comprises pawls 140a, 140b mounted on levers 151a,151b respectively. These levers are pivoted at 152a,152b to plate 140 of the intermediate frame 113 for movement, parallel to the plane of plate 140, by a common operating handle 127. Handle 127 is pivoted at 127a to the plate 140 and connected to one end of levers 151a,151b by pivoted links 153a,153b.

The lock-out device 116 further comprises apertures 143a,143b in the associated guide rails 112a,112b which lie opposite the pawls 140a,140b and into which the pawls can engage, when the springs 121 are in their relaxed state. Engagement of pawls 140a,140b in apertures 143a,143b locks the intermediate frame 113 rigidly to the upper frame 112 thereby eliminating the fore and aft isolating effect of the springs 121.

A position adjusting device is formed by a pair of toothed racks 123a,123b formed on the L section members 150c, 150b and having a plurality of upwardly directed teeth. The position adjusting device further comprises pawls 124a, 124b mounted on the opposite end of the levers 151a,151b and movable by movement of handle 127 into the adjacent one of the teeth of the racks 123a,123b.

The lengths of pawls 124a,124b and pawls 140a,140b are such that in the intermediate 'B' position of levers 151a, 151b, shown in FIG. 8, these pawls act to lock the frames 111, 112, 113 rigidly together, whereas in the chain dotted 'A' position of operating handle 127 in FIG. 8, the pawls 124a,124b penetrate further into the racks 123a, 123b but pawls 140a,140b are withdrawn from recesses 143a, 143b. This releases the upper frame 112 for resilient fore and aft movement relative to the lower frame 111 and intermediate frame 113.

In the chain dotted 'C' position of handle 127 in FIG. 8, the pawls 124a,124b are withdrawn from the racks to permit fore and aft adjustment of the upper frame 112 and intermediate frame 113 relative to the lower frame 111. The handle 127 is biassed towards its central position by two opposed springs 154a,154b connected between the handle 127 and lugs 155a,155b on the plate 140. The springs also serve to bias a detent pin 156 on handle 127 into engagement with locating apertures 157a and 157b positioned on plate 140 in the 'A' and 'B' positions of the handle.

In operation of the seat mounting device after it has been installed in a vehicle, fore and aft adjustment of the seat position relative to the vehicle floor is effected by lifting the operating handle 127 and moving it into the 'C' position of FIG. 8, thereby withdrawing the pawls 124a,124b, from the racks 123a,123b. The seat occupant can then push the seat forwards or backwards to a selected position. The springs 154a will automatically return the operating handle 127 from the 'C' position shown in FIG. 8 to its central or 'B' position and the corresponding movement of pawl levers 151a,151b will engage pawls 124a,124b with the racks 123a,123b to lock the intermediate frame 113 and the upper frame 112 to the lower frame 111 in the adjusted position of the seat. In order to release the upper frame 112 for movement relative to the intermediate frame 113 under the control of the springs 121, the operating handle 127 is raised and moved to its 'A' position in which detent pin 156 engages in aperture 157a and in which pawls 140a, 140b are withdrawn from the recesses 143a,143b in the rails 112a,112b.

Although the vehicle seat mounting device has been described in relation to illustrated embodiments in which the guide rails are secured to the upper frame, it will be evident that the guide rails could be secured alternatively to the lower frame, and the rollers to the upper frame.

Again, in both embodiments, the positions of the toothed racks and the associated pawls could be interchanged and the racks, thus forming the first actuator, could be made movable into engagement with such pawls.

The use of reference numerals in the claims appended hereto is intended to assist reading of the claims in conjunction with the description, and not in any way to place limitations on the scope of the protection afforded by the claims.

I claim:

1. A vehicle seat mounting device comprising two frames (11, 12), means mounting said frames one above the other for connection to the floor of a vehicle and to the underside of a vehicle seat, said mounting means comprising spaced-apart guide rails (11a, 11b) on one of said frames (11) and rollers (17) on the other frame (12), said rollers engaging in the guide rails (11a, 11b) to permit relative sliding movement between the two frames, a third or intermediate frame (13), a position-adjusting device (15) including means for selectively connecting said intermediate frame (13) to a first one of the frames (11) and spring means (21) interposed between the intermediate frame (13) and the second frame (12), to allow a predetermined amount of relative movement therebetween, the position-adjusting device including a first actuator (24b, 24a) movable into and out of an engaged-state in which it locks the position-adjusting device (15) in any one of a plurality of selected static positions of the first frame (11) relative to the intermediate frame (13), lock-out means (16) including a second actuator (40h) movable into and out of an engaged state in which it causes the lock-out means (16) to lock the intermediate frame (13) to the second frame (12) thereby rendering the spring means (21) inoperative, characterised by a common operating member (27 or 127) and coupling means (25b, 34, 35) connecting the operating member (27) to said first actuator (24b or 124b) and to said second actuator (40h or 140b) and movable between a first mode 'A' in which the first actuator (24b) is in its engaged state and the second actuator (40h) is in its disengaged state so that the first and third frames (11, 13 or 111, 113) are secured together but movable relative to the second frame (12 or 112) under the restraint of the spring means (21 or 121), a second mode 'B' in which both first and second actuators are in their engaged state so that relative movement between the first, second and third frames is prevented, and a third mode 'C' in which the first actuator is in its disengaged state and the first frame is movable relative to the second and third frames to change their selected relative positions.

2. A vehicle seat mounting device according to claim 1 characterised in that the means connecting the operating member to said first actuator is a lever (151b) mounted on the intermediate frame (113), the first actuator comprising a position-adjustment pawl (124b) movable by said lever for engagement with a recess of a rack (123b) on the first frame (111) and the second actuator is a lock-out pawl (140b) movable by said lever for engagement with a recess (143b) on the second frame (112), the disposition of the pawls being such that at least one is always in engagement with one of the above-mentioned recesses.

3. A vehicle seat mounting device according to claim 1, characterised in that the lock-out means (16) comprises a plate (40) carrying the second actuator, which actuator is movable in a direction perpendicular to the guide rails (11a, 11b) into and out of locking engagement with the intermediate frame (13), said position-adjusting device comprises a toothed rack member (23b) extending parallel to the guide rails, and a pawl member (24b) and means mounting one of said members on the first frame (11) and mounting the other of said members on the intermediate frame (13), the first actuator comprising one of said members and being movable into engagement with the other of said members to lock the first frame (11) to the intermediate frame (13), and said coupling means comprises a pawl (45) for operating the second actuator, which pawl is engageable with said plate (40) to move the plate laterally, the coupling means so interconnecting the first and second actuators that the first or position-adjusting actuator remains engaged as the second actuator (40h) is moved into and out of engagement by movement of the operating member (27) over a first arc of movement to operate the lock-out device, and the second actuator remains engaged to maintain the 'lock-out' as the first actuator is disengaged by a movement of the operating member beyond said first arc of movement to permit position-adjustment of the seat.

4. A vehicle seat according to claim 3, characterised in that said first actuator comprises the pawl member (24b) which is mounted on the first frame (11), and said toothed rack member (23b) is secured to the intermediate frame (13) and that the first and second actuators are interconnected by a lost motion connection (such as 35,35') forming part of said coupling such that the first actuator (24b) is disengaged only at the one end ('C') of an arc of movement of the operating member (27) over the remainder of which it is held engaged, and the second actuator (40h) is disengaged only at the opposite end ('A') of said arc movement of the operating member, so that at any intermediate position 'B' on said arc, the first and second actuators are both in an engaged state.

5. A vehicle seat mounting device according to claim 4, characterised in that the position-adjusting device includes a second toothed rack (23a) disposed on the opposite side of the seat mounting device from the first toothed rack (23b) and the first actuator includes a second pawl (24a) for engagement with the teeth on the second toothed rack (23a), the position-adjusting device further including first and second actuating shafts (25b,25a) disposed in parallel-spaced relationship on opposite sides of the device, a connecting member (32) interconnecting the shafts for mutually-opposite rotation, the first-mentioned pawl (24b) being mounted on the first shaft (25b) and connected thereto by means of said lost motion connection (35, 35'), said second pawl (24a) being rigidly secured to the second shaft (25a) and the connecting member (32) being connected to the first shaft (25b) via a second lost-motion connection (30, 31) such that the second shaft is rotated and both pawls (24a,24b) are disengaged from said second rack only at one end of said arc of movement of the first shaft to effect operational mode 'C' whereas modes 'B' and 'A' are effected sequentially by rotation of the first shaft over said arc of movement.

6. A vehicle seat mounting device according to claim 5, characterised in that second actuator pawl (45) is rigidly connected to the first actuating shaft (25b) and is engageable with a flange (40j) upstanding from the plate (40).

7. A vehicle seat mounting device according to any one of claims 3 to 6, characterised in that said guide rails are channel-section members (11a,11b) and said intermediate frame (13) comprises L section members (13a,13b) which fit slidably within the channel-section members and carry said toothed racks (23a,23b).

8. A vehicle seat mounting device according to claim 7, characterised in that said second actuator includes pawls (40g,40h) and that the intermediate frame (13) carries slotted plates (42a,32b) having therein slots (43a,43b) for engagement with said pawls (40g,40h).

* * * * *